United States Patent
Nagao et al.

(10) Patent No.: US 9,469,193 B2
(45) Date of Patent: Oct. 18, 2016

(54) INFORMATION PROCESSING TERMINAL, DISPLAY DEVICE, INFORMATION PROCESSING METHOD, DISPLAY METHOD, INFORMATION PROCESSING PROGRAM AND DISPLAY PROGRAM

(75) Inventors: Shunichiro Nagao, Saitama (JP); Yozo Takehara, Saitama (JP)

(73) Assignee: PIONEER CORPORATION, Kanagawa (JP)

( * ) Notice: Subject to any disclaimer, the term of this patent is extended or adjusted under 35 U.S.C. 154(b) by 108 days.

(21) Appl. No.: 14/367,627

(22) PCT Filed: Dec. 22, 2011

(86) PCT No.: PCT/JP2011/079906
§ 371 (c)(1),
(2), (4) Date: Jun. 20, 2014

(87) PCT Pub. No.: WO2013/094066
PCT Pub. Date: Jun. 27, 2013

(65) Prior Publication Data
US 2015/0328987 A1 Nov. 19, 2015

(51) Int. Cl.
*G06F 9/00* (2006.01)
*B60K 35/00* (2006.01)
*G07C 7/00* (2006.01)
*G01C 21/36* (2006.01)
*G08G 1/16* (2006.01)

(52) U.S. Cl.
CPC ............ *B60K 35/00* (2013.01); *G07C 7/00* (2013.01); *B60K 2350/352* (2013.01); *B60K 2350/967* (2013.01); *G01C 21/36* (2013.01); *G08G 1/166* (2013.01)

(58) Field of Classification Search
CPC ...................................................... B60K 35/00
USPC ............ 340/425.5, 438, 461; 701/200, 209; 345/2.3; 709/310
See application file for complete search history.

(56) References Cited

U.S. PATENT DOCUMENTS

| | | | |
|---|---|---|---|
| 2003/0153846 A1* | 8/2003 | Marple-Horvat | A61B 5/18 600/587 |
| 2008/0114541 A1* | 5/2008 | Shintani | G01C 21/362 701/420 |
| 2014/0015737 A1* | 1/2014 | Inoue | H04M 1/7253 345/2.3 |

FOREIGN PATENT DOCUMENTS

| | | |
|---|---|---|
| JP | 2000-002551 | 1/2000 |
| JP | 2005-326347 | 11/2005 |
| JP | 2010-127781 | 6/2010 |
| JP | 2010-130670 | 6/2010 |
| JP | 2011-223511 | 11/2011 |

OTHER PUBLICATIONS

International Search Report, PCT/JP2011/079906, Apr. 10, 2012.

* cited by examiner

*Primary Examiner* — Brent Swarthout
(74) *Attorney, Agent, or Firm* — Young & Thompson

(57) ABSTRACT

The display device is loaded on a vehicle, and connects the communication with the information processing terminal via the connection unit. Specifically, the display device obtains and displays an application image outputted by the information processing terminal. Also, the display device obtains, from the information processing terminal, a property of the application generating the application image. The property of the application may include information whether or not the application is controllable by an external device, the reliability of the application, the genre of the application and the display appropriateness. Then, the display device regulates the display of the application image based on the obtained property of the application and the running state of the vehicle.

4 Claims, 8 Drawing Sheets

INFORMATION PROCESSING TERMINAL, DISPLAY DEVICE, INFORMATION PROCESSING METHOD, DISPLAY METHOD, INFORMATION PROCESSING PROGRAM AND DISPLAY PROGRAM

TECHNICAL FIELD

The present invention relates to a technique for regulating display of images by a display device installed in a vehicle.

BACKGROUND TECHNIQUE

The Road Traffic Law prohibits a driver of a vehicle from gazing an image displayed on an image display device during driving. An on-vehicle device such as a car navigation device is configured not to display the image of TV and/or DVD and not to accept an operational input, during the driving of the vehicle. Regulating the image display and the operational input during the driving of the vehicle is called "Traveling regulation".

Patent Reference 1 discloses a system including a portable terminal and an on-vehicle device communicable with each other by wireless communication, wherein the portable terminal obtains travelling information from the on-vehicle device and an operational input of a certain kind for the application being executed in the portable terminal is regulated.

On the other hand, the on-vehicle device such as a car navigation device and a terminal device such as a smartphone are connected and used. For example, there is proposed a technique of transmitting the display image of the smartphone to the on-vehicle device to display it on the display unit of the on-vehicle device and enabling the operation of the application of the smartphone by a touch input to the display unit of the on-vehicle device, by incorporating a dedicated module into the application installed in the smartphone (See. Non-Patent Reference 1).

PRECEDING TECHNICAL REFERENCE

Patent Reference

Patent Reference 1: Japanese Patent Application Laid-Open under No. 2010-130670

Non-Patent Reference

Non-Patent Reference 1: AppRadio Pioneer Electronics USA http:://www.pioneerelectronics.com/PUSA/Car/AppRadio

DISCLOSURE OF INVENTION

Problem to be Solved by the Invention

Normally, many applications are installed in a smartphone. In the technique of Non-Patent Reference 1, since the dedicated module is incorporated for each application, the applications to which the dedicated module is incorporated and the applications to which the dedicated module is not incorporated are mixed in the smartphone. Therefore, it is desired to execute the travelling regulation by an appropriate method in accordance with whether or not the dedicated module is incorporated and the property of each application.

The above is an example of the problem to be solved by the present invention. It is an object of the present invention to execute appropriate travelling regulation, in a display device loaded on a vehicle and connected to an information processing terminal, in accordance with the property of the application on the information processing terminal side.

Means for Solving the Problem

One invention is a display system which comprises a display device loaded on a vehicle and an information processing terminal, and which displays an image of an application executed by the information processing terminal on the display device, wherein the information processing terminal comprises: a property transmission unit which obtains a property of the application generating an application image to be displayed on the display device; and an image transmission unit which transmits the application image to the display device, and wherein the display device comprises: a display unit which displays the application image obtained from the information processing terminal; and a control unit which applies a predetermined regulation to a display of the application image based on the property of the application obtained from the information processing terminal and a running state of the vehicle.

Another invention is a display device loaded on a vehicle, comprising: a display unit which displays an application image obtained from an information processing terminal; and a control unit which applies a predetermined regulation to a display of the application image based on a property of an application generating the application image obtained from the information processing terminal and a running state of the vehicle.

Still another invention is an information processing terminal comprising: an image transmission unit which transmits an application image generated by an application executed on the information processing terminal to a display device loaded on a vehicle; and a property transmission unit which obtains a property of the application, that is used to determine whether or not to apply a predetermined regulation to a display of the application image, and transmits the property to the display device.

Still another invention is a display method executed by a display device loaded on a vehicle, comprising: a display process which displays an application image obtained from an information processing terminal; and a control process which applies a predetermined regulation to a display of the application image based on a property of an application generating the application image obtained from the information processing terminal and a running state of the vehicle.

Still another invention is an information processing method executed by an information processing terminal, comprising: an image transmission process which transmits an application image generated by an application executed on the information processing terminal to a display device loaded on a vehicle; and a property transmission process which obtains a property of the application, that is used to determine whether or not to apply a predetermined regulation to a display of the application image, and transmits the property to the display device.

Still another invention is a display program which makes a display device execute the above display method.

Still another invention is an information processing program which makes an information processing terminal execute the above information processing method.

Still another invention is a storage medium on which the above program is stored.

DETAILED DESCRIPTION OF THE PREFERRED EMBODIMENTS

Figure 1:
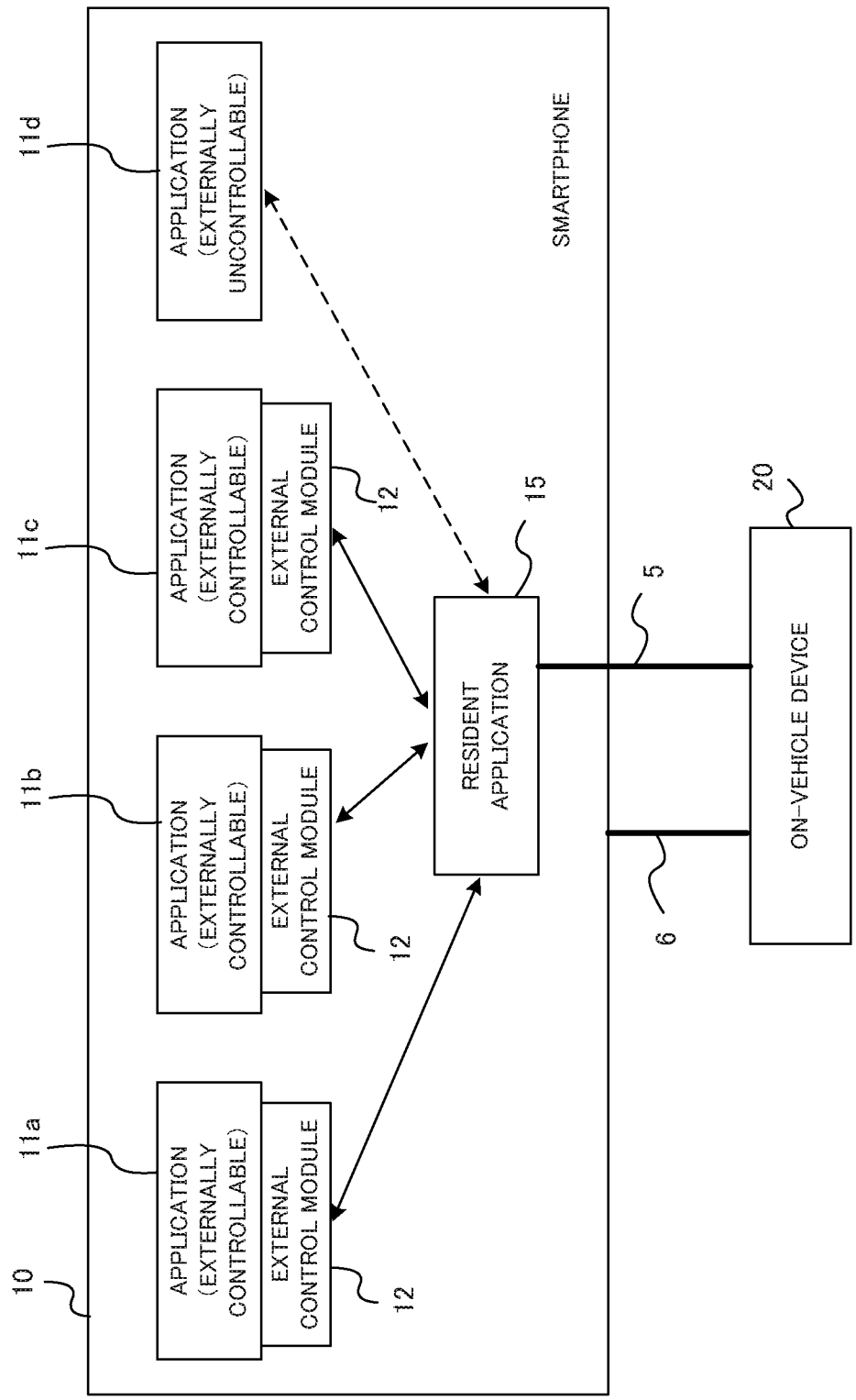
FIG. 1 shows a configuration of embodiments of the present invention.

According to one aspect of the present invention, there is provided a display system which comprises a display device loaded on a vehicle and an information processing terminal, and which displays an image of an application executed by the information processing terminal on the display device, wherein the information processing terminal comprises: a property transmission unit which obtains a property of the application generating an application image to be displayed on the display device; and an image transmission unit which transmits the application image to the display device, and wherein the display device comprises: a display unit which displays the application image obtained from the information processing terminal; and a control unit which applies a predetermined regulation to a display of the application image based on the property of the application obtained from the information processing terminal and a running state of the vehicle.

In one mode of the above display system, the property of the application includes information indicating whether or not the application is controllable by the display device, and the control unit may apply the predetermined regulation to the display of the application image if the running state is running and the obtained property includes information indicating that the application is not controllable by the display device.

According to another aspect of the present invention, there is provided an information processing terminal comprising: an image transmission unit which transmits an application image generated by an application executed on the information processing terminal to a display device loaded on a vehicle; and a property transmission unit which obtains a property of the application, that is used to determine whether or not to apply a predetermined regulation to a display of the application image, and transmits the property to the display device.

The information processing terminal transmits the application image to the display device by the image transmission unit such as HDMI. The information processing terminal obtains, from the image transmission unit, the property of the application which is executed on the information processing terminal and which is generating the image being outputted, and transmits the property to the display device.

The display device determines whether or not to regulate the display of the application image based on the property received from the information processing terminal.

In one mode of the above information processing terminal, the property of the application includes information indicating whether or not the application is controllable by the display device.

In a preferred example, the property of the application includes information related to the reliability of the application. In another preferred example, the property of the application includes information related to the genre of the application. In still another preferred example, the property of the application includes information related to display appropriateness in accordance with the kind of the application image being drawn.

In still another aspect of the present invention, there is provided a display device loaded on a vehicle, comprising: a display unit which displays an application image obtained from an information processing terminal; and a control unit which applies a predetermined regulation to a display of the application image based on a property of an application generating the application image obtained from the information processing terminal and a running state of the vehicle.

The above display device obtains and displays the application image generated by the application being executed on the information processing terminal. The control unit obtains, from the information processing terminal, the property of the application generating the application image, and regulates the display of the application image based on the property and the running state of the vehicle.

In one mode of the above display device, the control unit regulates the display of the application image if the running state is running and the obtained property includes information indicating that the application is not controllable by the display device. In this mode, for the application uncontrollable by the display device, the display device can regulate the display of the application image.

In a preferred example, the display device further comprises an operation transmission unit which obtains an operation by a user and transmits operation information to the information processing terminal, and the control unit regulates a display of the application image and a transmission of the operation information based on reliability of the application, if the running state is running and the obtained property includes information related to the reliability of the application. In this mode, for the application of low reliability, the display device can regulate the display of the application image and the transmission of the operation information.

In another preferred example, the display device further comprises an operation transmission unit which obtains an operation by a user and transmits operation information to the information processing terminal, and the control unit regulates a display of the application image and a transmission of the operation information based on a genre of the application, if the running state is running and the obtained property includes information related to the genre of the application. In this mode, it is possible to regulate the display of the application image and the transmission of the operation information in accordance with the genre of the application.

In still another preferred example, the display device further comprises an operation transmission unit which obtains an operation by a user and transmits operation information to the information processing terminal, and the control unit regulates a display of the application image and a transmission of the operation information based on a display appropriateness in accordance with a kind of the application image, if the running state is running and the obtained property includes information related to the display appropriateness in accordance with the kind of the application image. In this mode, it is possible to regulate the display of the application image and the transmission of the operation information in accordance with the display appropriateness of the application image.

According to still another aspect of the present invention, there is provided an information processing method executed by an information processing terminal, comprising: an image transmission process which transmits an application image generated by an application executed on the information processing terminal to a display device loaded on a vehicle; and a property transmission process which obtains a property of the application, that is used to determine whether or not to apply a predetermined regulation to a display of the application image, and transmits the property to the display device.

According to still another aspect of the present invention, there is provided a display method executed by a display device loaded on a vehicle, comprising: a display process which displays an application image obtained from an information processing terminal; and a control process which applies a predetermined regulation to a display of the application image based on a property of an application generating the application image obtained from the information processing terminal and a running state of the vehicle.

According to still another aspect of the present invention, the information processing program executed by an information processing terminal makes the information processing terminal execute the above information processing method.

According to still another aspect of the present invention, the display program executed by a display device loaded on a vehicle makes the display device execute the above display method.

Embodiments

Preferred embodiments of the present invention will be described below with reference to the attached drawings.

[1st Embodiment]

FIG. 1 shows a configuration of a first embodiment of the present invention. As shown, a smartphone 10 serving as an information processing terminal is communicably connected to an on-vehicle device 20 serving as a display device. A typical example of the on-vehicle device 20 is a navigation device. The on-vehicle device 20 and the smartphone 10 are connected via two interfaces, specifically a SPP (Serial Port Profile) 5 of Bluetooth (Registered Trademark) and a HDMI 6. The SPP 5 is mainly used for the communication of control signals between the on-vehicle device 20 and the smartphone 10, and the HDMI 6 is mainly used for the transmission of video/audio data from the smartphone 10 to the on-vehicle device 20.

In the smartphone 10, a plurality of applications 11a to 11d and a resident application 15 are installed. The applications 11a to 11d include various applies such as a video reproduction application, an audio reproduction application and a game application.

In the following description, the application 11 is expressed with a subscript such as "application 11b" when a certain application is intended, and the application 11 is simply expressed as "application 11" when a certain application is not intended.

In each of the applications 11a to 11d, an external control module 12 is incorporated. The external control module 12, incorporated in each of the applications 11, is dedicated software for enabling an external device to control the application 11 in the smartphone 10. Specifically, when incorporated in the application 11, the external control module 12 transmits and receives necessary information to and from the on-vehicle device 20 via the resident application 15. Thus, the application 11 to which the external control module 12 is incorporated can be controlled by the external on-vehicle device 20. The application 11 cannot be controlled by the on-vehicle device 20 if the external control module 12 is not incorporated.

The image outputted by the application 11 can be transmitted to the on-vehicle device 20 via the HDMI 6 to be displayed.

In the example of FIG. 1, the applications 11a to 11c can be controlled by the on-vehicle device 20 because the external control module 12 is incorporated in the applications 11a to 11c. Specifically, the operational input image generated by the application 11a is transmitted to the on-vehicle device 20 via the HDMI 6, and is displayed on the on-vehicle device 20. The operation information indicating the operational input that a user made to the on-vehicle device 20 with watching the operational input image is transmitted to the application 11a via the SPP 5 and the resident application 15. In this way, by making the operational input to the on-vehicle device 20, the user can operate the application 11a. The application 11 to which the external control module 12 is incorporated will be hereinafter referred to as "an externally controllable application".

On the other hand, the application 11d cannot be controlled by the on-vehicle device 20 because the external control module 12 is not incorporated in the application 11d. The application 11 to which the external control module 12 is not incorporated will be hereinafter referred to as "an externally uncontrollable application".

The resident application 15 is constantly made active during the operation of the smartphone 10. For the externally controllable applications 11a to 11c to which the external control module 12 is incorporated, the resident application 15 enables the control of the applications 11a to 11c from the on-vehicle device 20 by communicating with the external control module 12. Due to the existence of the resident application 15, it is possible to establish the communication connection between the smartphone 10 and the on-vehicle device 20, even if none of the applications 11 is active. In addition, by receiving the request from the on-vehicle device 20, the resident application 15 can activate other application 11. Namely, based on the instruction inputted by the user to the on-vehicle device 20, the resident application 15 can activate any one of the applications 11.

Figure 2:
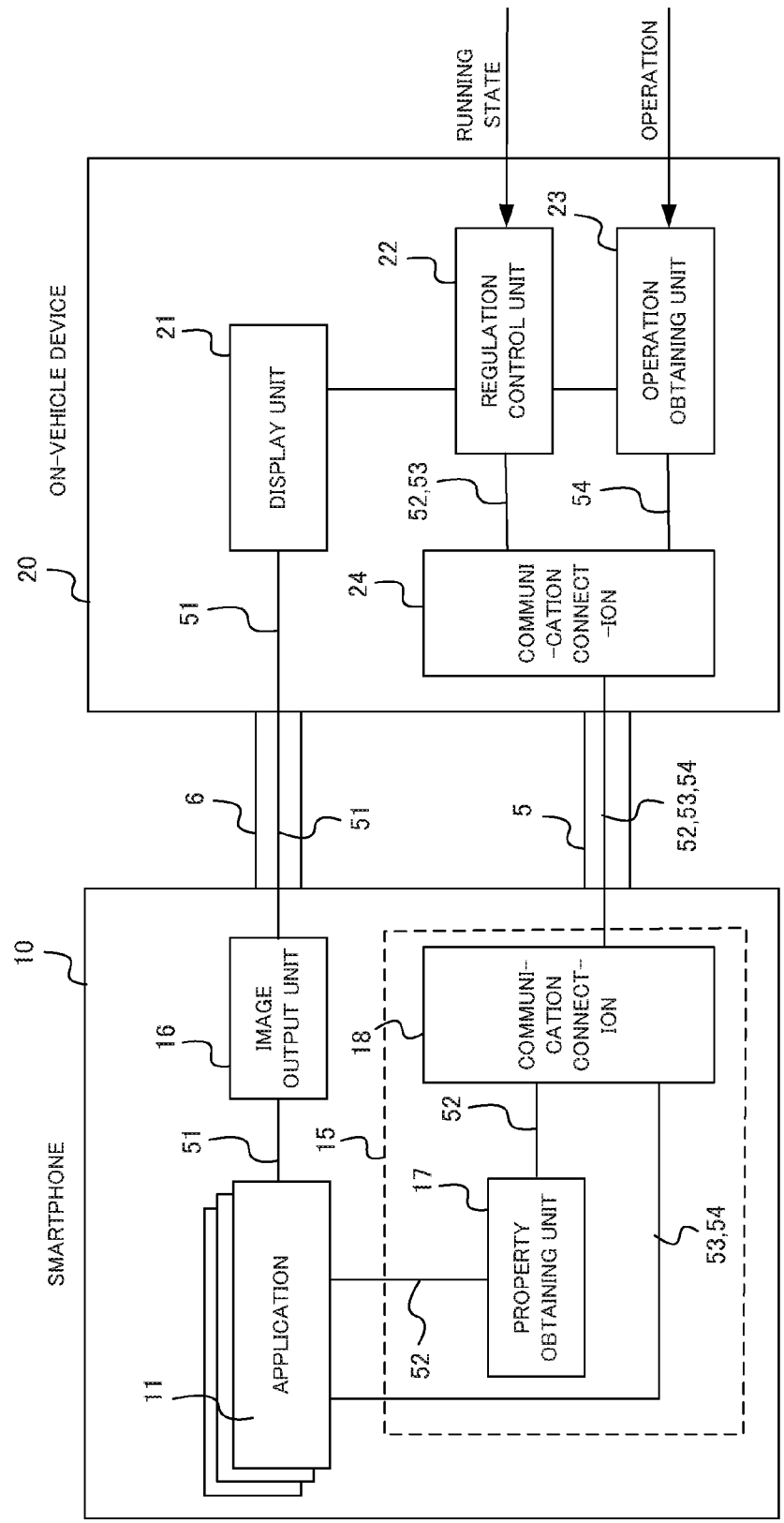
FIG. 2 is a block diagram illustrating a functional configuration of a smartphone and an on-vehicle device.

Next, a functional configuration of the smartphone 10 and the on-vehicle device 20 will be described. FIG. 2 is a block diagram showing a functional configuration of the smartphone 10 and the on-vehicle device 20.

The smartphone 10 includes the applications 11, an image output unit 16, a property obtaining unit 17 and a communication connection unit 18. The applications 11 include various kinds of applications as described above with reference to FIG. 1. The property obtaining unit 17 and the communication connection unit 18 are controlled by the resident application 15 shown in FIG. 1.

The image output unit 16 outputs the image data 51 generated by the application 11 to the on-vehicle device 20 via the HDMI 6. The property obtaining unit 17 obtains the property 52 of the application 11 and supplies it to the communication connection unit 18. In this embodiment, "the property of the application" is information indicating whether or not the application can be controlled by the external on-vehicle device 20. The property obtaining unit 17 can determine whether or not the application 11 can be controlled by the external on-vehicle device 20 based on whether or not the external control module 12 is incorporated in the application 11. Specifically, the property obtaining unit 17 can obtain the information indicating whether or not the application 11 can be controlled by the on-vehicle device 20 by communicating with the application 11. Alternatively, in the case where the external control module 12 is incorporated in the application 11, the property obtaining unit 17 can obtain the information indicating whether or not the application can be controlled by the external on-vehicle device 20 by directly communicating with the external control module 12.

The communication connection unit 18 is an interface for transmitting and receiving data to and from the on-vehicle device 20 via the SPP 5. The communication connection unit 18 receives the property 52 of the application 11 obtained by the property obtaining unit 17 in the above manner, and transmits it to the on-vehicle device 20 via the SPP 5. Also, the communication connection unit 18 receives the information 53 (hereinafter referred to as "the running state information") indicating whether or not the vehicle on which the on-vehicle device 20 is loaded is running from the on-vehicle device 20 via the SPP 5, and supplies it to the application 11. In addition, the communication connection unit 18 receives the information 54 (hereinafter referred to as "the operation information") indicating the operational input that the user made to the on-vehicle device 20 from the on-vehicle device 20 via the SPP 5, and supplies it to the application 11 that is outputting the image to the on-vehicle device 20.

On the other hand, the on-vehicle device 20 includes a display unit 21, a regulation control unit 22, an operation obtaining unit 23 and a communication connection unit 24. The display unit 21 may be configured by a liquid crystal panel with a touch panel. The display unit 21 displays the image data 51 (i.e., the application image) of the application 11 received from the smartphone 10 via the HDMI 6.

The regulation control unit 22 obtains the running state information 53 of the vehicle from external, and supplies it to the communication connection unit 24. Here, as the running state information 53 of the vehicle, the parking information of the vehicle may be used, for example. The parking information is "OFF" when the vehicle is running and is "ON" when the vehicle is stopping. As the running state information 53 of the vehicle, a signal other than the parking information may be used. For example, the speed pulse of the vehicle (not shown) maybe used, or the GPS information or G-sensor information of a car navigation device may be used.

The operation obtaining unit 23 detects the user's operational input to the touch panel overlaid on the display 21 of the on-vehicle device 20, generates the operation information 54 corresponding to the operational input and supplies it to the communication connection unit 24. As described above, on the display unit 21 of the on-vehicle device 20, the image data 51 generated by the application 11 in the smartphone 10 is displayed. Therefore, in the input mode of the application 11, the input image including buttons of the operational inputs is displayed on the display unit 21 of the on-vehicle device 20, and the operation obtaining unit 23 obtains the operation information 54 corresponding to the operational input that the user made to the input image.

The communication connection unit 24 is an interface for transmitting data to and receiving data from the smartphone 10 via the SPP 5. The communication connection unit 24 transmits the running state information 53 supplied from the regulation control unit 22 and the operation information 54 supplied from the operation obtaining unit 24 to the smartphone 10 via the SPP 5.

In the above configuration, the image output unit 16 functions as the image transmission unit of the present invention, and the property obtaining unit 17 and the communication connection unit 18 function as the property transmission unit of the present invention. Also, the display unit 21 functions as the display unit of the present invention, the regulation control unit 22 functions as the control unit of the present invention, and the operation obtaining unit 22 and the communication connection unit 24 function as the operation transmission unit of the present invention.

Next, the travelling regulation control according to the first embodiment will be described. As described with reference to FIG. 1, the externally controllable applications 11*a* to 11*c* can be controlled by the external on-vehicle device 20 because the external control module 12 is incorporated. On the contrary, the externally uncontrollable application 11*d* cannot be controlled by the on-vehicle device 20 because the external control module 12 is not incorporated.

In view of the problem of the Road Traffic Law mentioned above, while the vehicle on which the on-vehicle device 20 is loaded is running, it is not preferred to display the moving picture generated by a video reproduction application and the like installed in the smartphone 10 on the on-vehicle device 20. Also, as to the other applications of various kinds, it is not preferred to display such images that the user gazes at for a certain period of time on the on-vehicle device 20. Therefore, it is necessary to regulate the display of the images generated by the various applications 11 in the smartphone 10 on the on-vehicle device 20, according to need. Particularly, it is necessary to appropriately execute the travelling regulation in the case where the externally controllable application and the externally uncontrollable application are mixed in the smartphone 10.

Accordingly, in this embodiment, the resident application 15 in the smartphone 10 determines whether the application 11 outputting the image to the on-vehicle device 20 (hereinafter referred to as "the image displaying application") is the externally controllable application or the externally uncontrollable application, and transmits the result to the on-vehicle device 20.

If the image displaying application is the externally controllable application, the on-vehicle device 20 notifies the running state of the vehicle to the externally controllable application, and entrusts the travelling regulation to the externally controllable application. The externally controllable application receives the running state from the on-vehicle device 20, and executes the travelling regulation, as necessary, based on the running state and the application image that the externally controllable application itself is outputting.

On the other hand, if the image displaying application is the externally uncontrollable application, the on-vehicle device 20 cannot control the externally uncontrollable application to execute the travelling regulation. Therefore, the on-vehicle device 20 executes the travelling regulation by itself. Specifically, the regulation control unit 22 in the on-vehicle device 20 obtains the property 52 of the application 11 from the smartphone 10 via the communication connection unit 24. When the regulation control unit 22 determines that the image displaying application is the externally uncontrollable application, it notifies to the display unit 21 that the travelling regulation is applied to the image transmitted from the externally uncontrollable application, and the display unit 21 displays the image with a predetermined travelling regulation.

Specific methods of the travelling regulation are as follows. If the application image is the moving picture of a movie, for example, displaying the image is stopped and a still picture is displayed, or a single color image such as a black image is displayed. If the application image is the image for the operational inputs to the application, the image is displayed but the input to the image is rejected or invalidated.

As described above, in this embodiment, based on whether the image displaying application is the externally controllable application or the externally uncontrollable application, it is determined whether the application 11 executes the travelling regulation or the on-vehicle device 20 executes the travelling regulation. Thereby, the travelling regulation can be appropriately executed even when the externally controllable application and the externally uncontrollable application are mixed in the smartphone 10.

Figure 3:
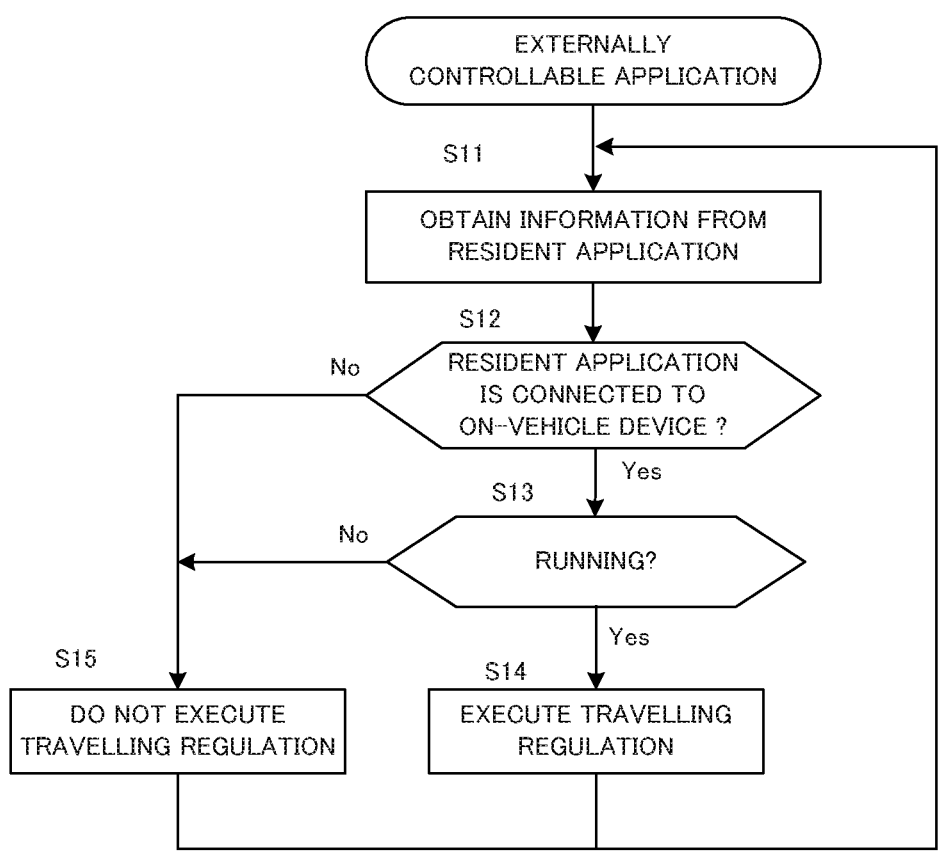
FIG. 3 is a flowchart of processing executed by an externally controllable application in the first embodiment.

Next, the specific processing of the above travelling regulation will be described. FIG. 3 is a flowchart of the processing executed by the externally controllable application. This processing is executed by the externally controllable application such as the applications 11a to 11c in FIG. 1.

First, the externally controllable application obtains the information from the resident application 15 (step S15).

Specifically, the externally controllable application obtains, from the resident application 15, the information indicating whether or not the resident application 15 is in connection with the on-vehicle device 20. When the resident application 15 is in connection with the on-vehicle device 20, the externally controllable application obtains the running state information 53 and the operation information 54 transmitted from the on-vehicle device 20.

Next, based on the information thus obtained, the externally controllable application determines whether or not the resident application 15 is in connection with the on-vehicle device 20 (step S12). If the resident application is in connection with the on-vehicle device 20 (step S12: Yes), the externally controllable application determines whether or not the running state is "running", i.e., whether or not the vehicle on which the on-vehicle device 20 is loaded is running (step S13). If the running state is "running" (step S13: Yes), the externally controllable application executes the travelling regulation, as necessary, based on the operational condition of the externally controllable application itself and the kind of the image being outputted (step S14). For example, if the externally controllable application is a video reproduction application and it is reproducing the moving picture, the externally controllable application stops the reproduction.

On the other hand, if it is determined in step S12 that the resident application 15 is not in connection with the on-vehicle device 20 or if it is determined in step S13 that the running state is not "running", the externally controllable application does not execute the travelling regulation because it is not necessary to execute the travelling regulation (step S15).

In this way, if the image displaying application is the externally controllable application, the externally controllable application itself executes the travelling regulation by its own determination based on the running state of the vehicle and the like.

Next, the processing executed by the resident application 15 in the travelling regulation control in this embodiment will be described with reference to the flowchart of FIG. 4. First, the resident application 15 tries to communicate with the on-vehicle device 20 by the communication connection unit 18 (step S21). When the communication with the on-vehicle device 20 is established (step S21: Yes), the resident application 15 obtains the information, including the property of the image displaying application, from the image displaying application, and transmits it to the on-vehicle device 20 (step S23). Specifically, the resident application 15 determines whether the image displaying application is the externally controllable application or the externally uncontrollable application by communicating with the image displaying application, and transmits the result to the on-vehicle device 20.

Next, the resident application 15 receives the running state information 53 and the operation information 54 from the on-vehicle device 20 (step S24), and transmits the running state information 53 and the operation information 54 thus received to the externally controllable application (step S25).

In this way, while the resident application 15 establishes the communication with the on-vehicle device 20, the resident application 15 positions itself between the application 11 and the on-vehicle device 20 and executes the intermediation processing of transmitting and receiving necessary information between the application 11 and the on-vehicle device 20.

Figure 5:
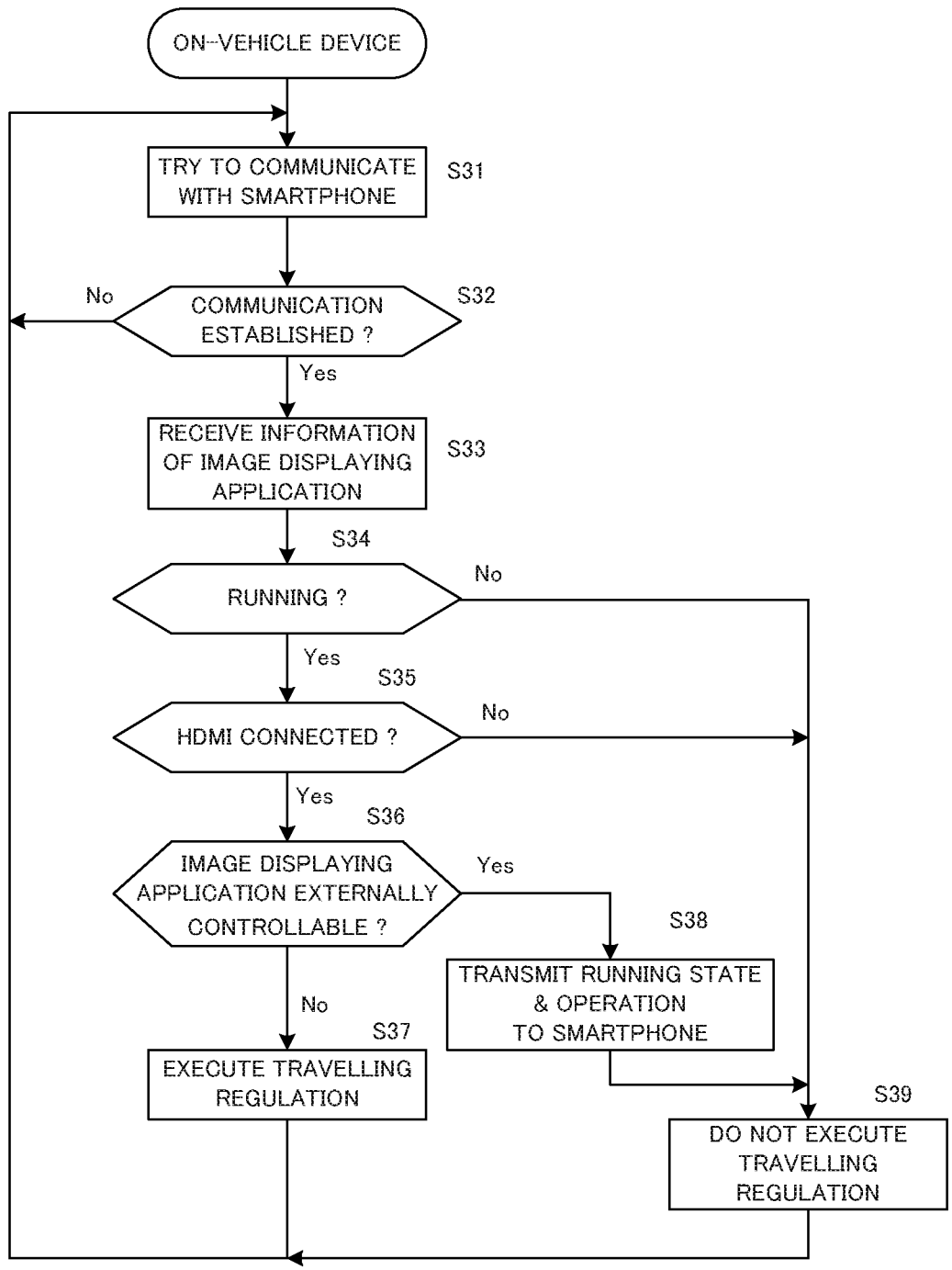
FIG. 5 is a flowchart of processing executed by the on-vehicle device in the first embodiment.

Next, the processing executed by the on-vehicle device 20 in the travelling regulation control of this embodiment will be described with reference to the flowchart of FIG. 5. This processing is realized by the computer loaded on the on-vehicle device 20, such as a CPU, which executes the program prepared in advance.

First, the on-vehicle device 20 tries to communicate with the smartphone 10 by the communication connection unit 24 (step S31). When the communication is established (step S32: Yes), the on-vehicle device 20 receives the information including the property of the image displaying application from the resident application 15 of the smartphone 10 (step S33). This process corresponds to step S23 in FIG. 4. Specifically, the on-vehicle device 20 receives, from the resident application 15, the information indicating whether the image displaying application is the externally controllable application or the externally uncontrollable application.

Next, the on-vehicle device 20 determines whether or not the running state of the vehicle is "running" (step S34). If the running state is "running", the on-vehicle device 20 determines whether or not the HDMI 6 is in connection (step S35). If the HDMI 6 is in connection (step S35: Yes), the on-vehicle device 20 determines whether or not the image displaying application is the externally controllable application (step S36).

If the image displaying application is the externally controllable application (step S36: Yes), the on-vehicle device 20 transmits the running state information 53 and the operation information 54 to the resident application 15 in the smartphone 10 (step S38). In this case, since the externally controllable application executes the travelling regulation by itself as described above, it is not necessary for the on-vehicle device 20 to execute the travelling regulation. Therefore, the on-vehicle device 20 does not execute the travelling regulation (step S39).

On the contrary, if the image displaying application is the externally uncontrollable application (step S36: No), the on-vehicle device 20 executes the travelling regulation by itself (step S37) because the on-vehicle device 20 cannot control the externally uncontrollable application to execute the travelling regulation.

If the running state is not "running" (step S34: No), it is not necessary to execute the travelling regulation, and the process goes to step S39. If the HDMI 6 is not in connection (step S35: No), the image from the image displaying application is not being displayed on the on-vehicle device 20 whatever kind the image displaying application is. Therefore, it is not necessary to execute the travelling regulation, and the process goes to step S39.

In this way, in the case where the on-vehicle device 20 is in connection with the smartphone 10 and is displaying the application image outputted by the image displaying application, if the image displaying application is the externally controllable application, the on-vehicle device 20 does not execute the travelling regulation by itself and entrusts the execution of the travelling regulation to the externally controllable application. On the contrary, if the image displaying application is the externally uncontrollable application, the on-vehicle device 20 executes the travelling regulation by itself. Thus, the execution of the travelling regulation can be ensured even when the externally controllable application and the externally uncontrollable application are mixed in the smartphone 10.

[2nd Embodiment]

Next, the second embodiment of the present invention will be described. In the first embodiment, the property of the application that the property obtaining unit 17 of the smartphone 10 obtains from the image displaying application is the information indicating whether or not the application is controllable by the external on-vehicle device 20. In contrast, in the second embodiment, "the property of the application" is the information on the reliability of the application. Namely, the on-vehicle device 20 determines whether to execute the travelling regulation by itself or to entrust the execution of the travelling regulation to the image displaying application, based on the reliability of the image displaying application.

Specifically, the reliability of the application is determined in advance based on the version of the external control module 12 incorporated in the application 11, and the information indicating the reliability is included in the external control module 12. Namely, the reliability of the application is defined for the externally controllable application, but is not defined for the externally uncontrollable application.

For example, assuming that the reliability of the application is defined by two levels, i.e., the reliability level-1 indicating high reliability and the reliability level-2 indicating low reliability, each of the externally controllable applications possesses information indicating either one of the reliability level-1 or the reliability level-2. For example, if an application is developed by the cooperation of the makers of the application and the on-vehicle device 20 or the operation of the application is inspected, the application has the reliability level-1 indicating high reliability.

The property obtaining unit 17 of the smartphone 10 obtains the reliability level of the external control module 12 incorporated in the image displaying application as the reliability level, and transmits it to the on-vehicle device 20. The on-vehicle device 20 determines whether or not to execute the travelling regulation based on the reliability level which is the property of the application. Specifically, for the image displaying application to which the external control module 12 of the reliability level-1 is incorporated, the on-vehicle device 20 entrusts the travelling regulation to the application 11 because its reliability is high. On the contrary, for the image displaying application to which the external control module 12 of the reliability level-2 is incorporated, the on-vehicle device 20 executes the travelling regulation by itself because its reliability is low. In this way, the on-vehicle device 20 can execute the travelling regulation by itself for the externally controllable application of low reliability, thereby to appropriately execute the travelling regulation.

Figure 4:
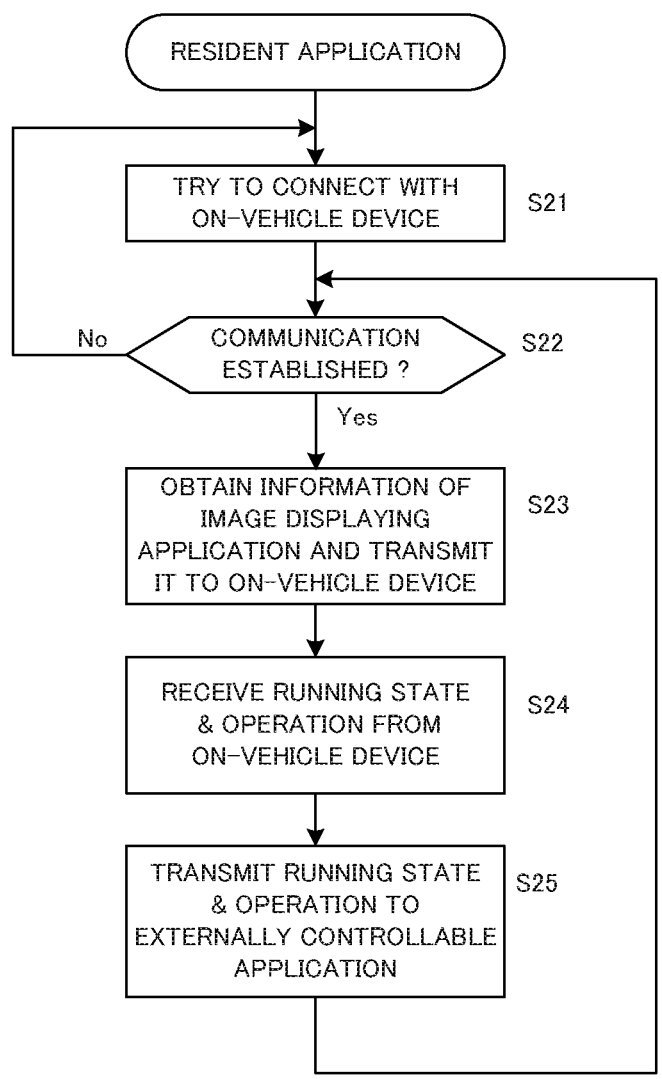
FIG. 4 is a flowchart of processing executed by a resident application in the first embodiment.

In the travelling regulation control in the second embodiment, except for the fact that the property of the application is the information indicating the reliability of the application, the processing by the externally controllable application is the same as that of the first embodiment shown in FIG. 3 and the processing by the resident application 15 is the same as that of the first embodiment shown in FIG. 4. The processing by the on-vehicle device 20 only differs from that of the first embodiment only in step S36 of FIG. 5. Namely, in the second embodiment, the on-vehicle device 20 determines in step S36 whether or not "the image displaying application is the externally controllable application and has the reliability level-1". If the image displaying application is the externally controllable application and has the reliability level-1 (step S36: Yes), the process goes to step S38, and the on-vehicle device 20 entrusts the execution of the travelling regulation to the image displaying application. On the contrary, if the image displaying application is not the externally controllable application (i.e., the externally uncontrollable application), or the image displaying application is the externally controllable application but its reliability is level-2, the process goes to step S37, and the on-vehicle device 20 executes the travelling regulation by itself.

In this way, according to the second embodiment, even if the image displaying application is the externally controllable application, the on-vehicle device 20 executes the travelling regulation by itself if the reliability of the image displaying application is low. Therefore, the travelling regulation can be certainly executed even when the application of low reliability is being executed.

(Modified Example)

In the above example, the reliability of the application is defined as the reliability of the external control module 12. Instead, the reliability of the application may be defined as the reliability of the application 11 being installed in the smartphone 10. In that case, the application 11 possesses the information indicating the reliability level.

[3rd Embodiment]

Next, the third embodiment of the present invention will be described. In the second embodiment, the property of the application is the reliability of the application, and the reliability is defined by two levels. In the third embodiment, the property of the application is the reliability of the application similarly to the second embodiment, but the reliability is defined by three levels. Specifically, for the externally controllable application, the reliability is defined by the level-1, the level-2 and the level-3 in the order from high reliability to low reliability. Then, the on-vehicle device 20 executes different processing in relation with the travelling regulation, depending on the reliability level. Specifically, if the reliability of the image displaying application is the level-1, the on-vehicle device 20 totally entrusts the travelling regulation to the image displaying application. If the reliability of the image displaying application is the level-2, the on-vehicle device 20 displays the application image outputted by the image displaying application, but does not transmit the operation information 54 inputted to the on-vehicle device 20 by the user to the smartphone 10. Specifically, when the regulation control unit 22 of the on-vehicle device 20 determines that the reliability of the image displaying application is the level-2, the regulation control unit 22 notifies to the operation obtaining unit 23 that the operation by the user is regulated. The operation obtaining unit 23 stops the supply of the operation information 54 to the communication connection unit 24. Thus, the image outputted by the image displaying application is displayed on the on-vehicle device 20, but operating the image displaying application from the on-vehicle device 20 is inhibited. If the reliability of the image displaying application is the level-3, the on-vehicle device 20 does not display the application image outputted by the image displaying application and does not transmit the operation information 54 inputted to the on-vehicle device 20 by the user to the smartphone 10. Thus, during the travelling of the vehicle, the user cannot do anything to the image displaying application.

In the travelling regulation control of the third embodiment, except for the fact that the property of the application is the information on the reliability of the application, the processing by the externally controllable application is the same as that in the first embodiment shown in FIG. 3, and the processing by the resident application is the same as that in the first embodiment shown in FIG. 4.

Figure 6:
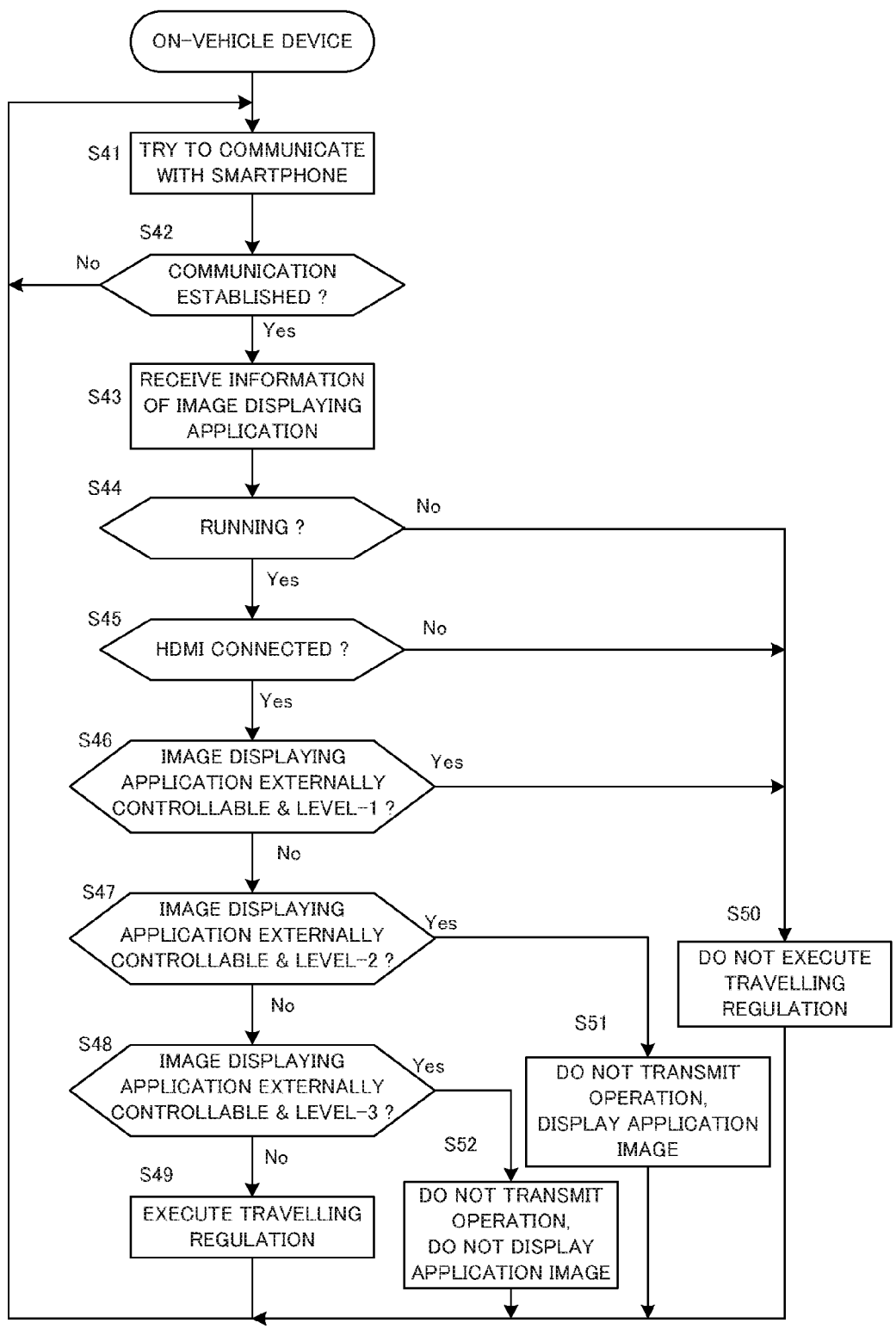
FIG. 6 is a flowchart of processing executed by the on-vehicle device in the third embodiment.

The processing by the on-vehicle device 20 in the third embodiment is shown in the flowchart of FIG. 6. In FIG. 6, since steps S41 to S45 are the same as steps S31 to S35 in the first embodiment shown in FIG. 5, the description thereof will be omitted.

In step S46, the on-vehicle device 20 determines whether or not the image displaying application is the externally controllable application and its reliability is the level-1. If the result of the determination is Yes, the process goes to step S50. Thus, the on-vehicle device 20 entrusts the execution of the travelling regulation to the image displaying application.

If the result of the determination in step S46 is No, the on-vehicle device 20 determines whether or not the image displaying application is the externally controllable application and its reliability is the level-2 (step S47). If the result of the determination is Yes, the on-vehicle device 20 displays the application image from the image displaying application, but does not transmit the operation information 54 of the user to the on-vehicle device 20 to the image displaying application (step S51).

If the result of the determination in step S47 is No, the on-vehicle device 20 determines whether or not the image displaying application is the externally controllable application and its reliability is the level-3 (step S48). If the result of the determination is Yes, the on-vehicle device 20 does not display the application image from the image displaying application and does not transmit the operation information 54 by the user to the on-vehicle device 20 to the image displaying application (step S52).

If the result of the determination in step S48 is No, the on-vehicle device 20 executes the travelling regulation by itself (step S49) because the image displaying application is the externally uncontrollable application.

As described above, in the third embodiment, the reliability of the externally controllable application is defined by three levels as the property of the application, and the different processing is executed in accordance with the level. Therefore, an appropriate travelling regulation can be executed in accordance with the reliability of the image displaying application.

(Modified Example)

In the above example, the reliability of the application is defined as the reliability of the external control module 12. Instead, the reliability of the application may be defined as the reliability of the application 11 being installed in the smartphone 10. In that case, the application 11 possesses the information indicating the reliability level.

In the above example, while the reliability is defined by three levels to execute different processing, the reliability may be defined by four or more levels to execute different processing for each level.

[4th Embodiment]

Next, the fourth embodiment of the present invention will be described. In the second and third embodiments, the property of the application is the information related to the reliability of the application. Instead, in the fourth embodiment, the property of the application is the information related to the genre of the application. The on-vehicle device 20 executes different travelling regulation for each genre of the application.

In one example, it is assumed that the genre of the application is classified into two genres. It is assumed that the genre-1 is the application which displays only still pictures, and the genre-2 is the application which displays moving pictures. In this case, the on-vehicle device 20 obtains the genre of the image displaying application as the property of the image displaying application. Then, the on-vehicle device 20 entrusts the travelling regulation to the image displaying application if the image displaying application belongs to the genre-1, and executes the travelling regulation by itself if the image displaying application belongs to the genre-2. As the processing in this case, instep S36 of the flowchart shown in FIG. 5, the on-vehicle device 20 determines whether or not "the image displaying application is the externally controllable application and the image displaying application is genre-1".

As another example, it is assumed that the genre of the application is classified into three genres. It is assumed that the genre-1 is the application which reproduces only the still pictures and the music, the genre-2 is the application for map or music reproduction, and the genre-3 is the application for reproducing moving picture or browser. In this case, the same processing as the third embodiment can be executed based on those three genres. Namely, if the image displaying application belongs to the genre-1, the on-vehicle device 20 entrusts the travelling regulation to the image displaying application. If the image displaying application belongs to the genre-2, the on-vehicle device 20 displays the application image outputted by the image displaying application, but does not transmit the operation information 54 that the user inputs to the on-vehicle device 20 to the smartphone 10. If the image displaying application belongs to the genre-3, the on-vehicle device 20 does not display the application image outputted by the image displaying application, and does not transmit the operation information 54 that the user inputs to the on-vehicle device 20 to the smartphone 10.

As the specific processing in this case, in the flowchart of FIG. 6, the on-vehicle device 20 determines in step S46 whether or not "the image displaying application is the externally controllable application and belongs to the genre-1", determines in step S47 whether or not "the image displaying application is the externally controllable application and belongs to the genre-2", and determines in step S48 whether or not "the image displaying application is the externally controllable application and belongs to the genre-3".

As described above, in the fourth embodiment, the property of the application is the information related to the genre of the application, and the method of the travelling regulation is changed based on the genre. Therefore, it is possible to execute the travelling regulation in an appropriate method for each genre of the application.

(Modified Example)

While the genre of the application is classified in two or three genres to execute different processing in the above example, the genre of the application may be classified in four or more genres to execute different processing for each genre.

[5th Embodiment]

Next, the fifth embodiment of the present invention will be described. In the fifth embodiment, the property of the application is the information related to a display appropriateness of the application image. Here, "display appropriateness" indicates whether the image is appropriate for the display during the travelling of the vehicle, i.e., it is not problematic to display the image, or it is inappropriate for the display during the travelling of the vehicle, i.e., it is not good to display the image. For example, the image appropriate for the display during the travelling includes the image of small information amount such as a still picture, and the image inappropriate for the display during the travelling includes a moving picture, an image having large information amount and an image requesting the user's operation.

Specifically, the image displaying application determines the display appropriateness of the image that the image display application itself is outputting, and outputs the information indicating that the display appropriateness is "inappropriate" to the property obtaining unit 17 if image displaying application is outputting the inappropriate image.

Figure 7A:
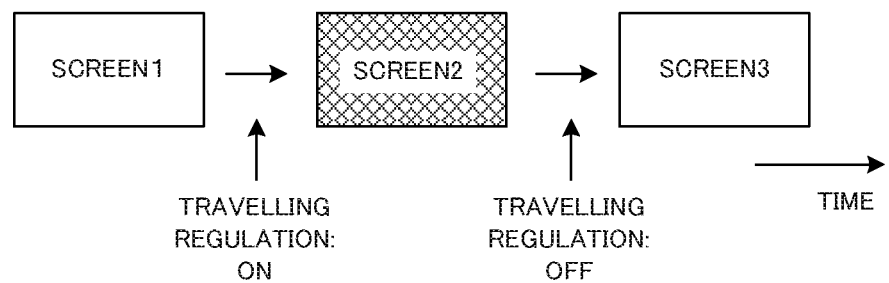
FIGS. 7A and 7B schematically show a method of the fifth embodiment.
Figure 7B:
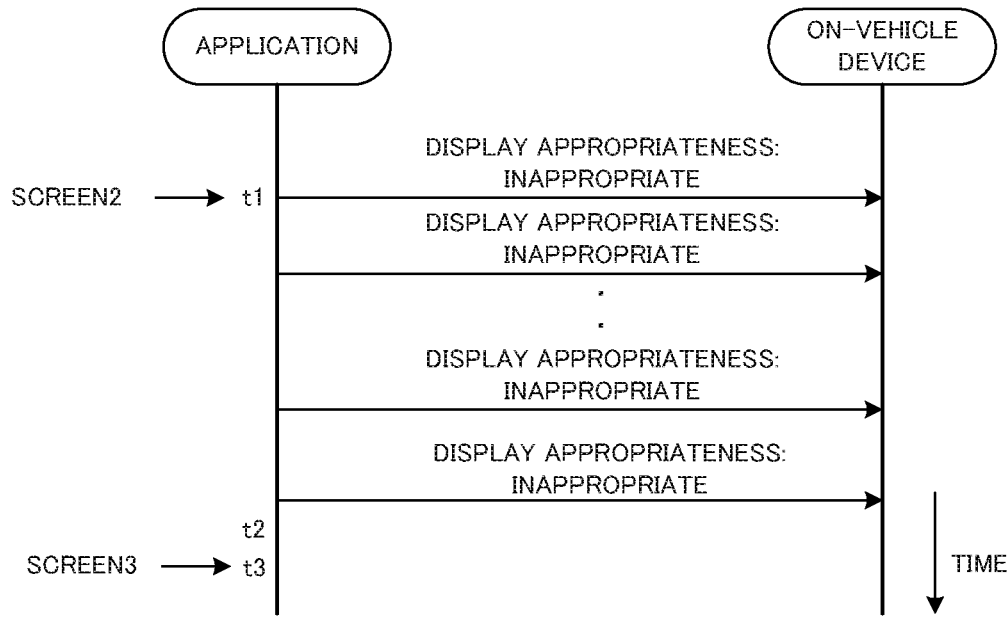

FIG. 7A schematically shows the method of the fifth embodiment. In FIG. 7A, the screen-2 displays an image whose display appropriateness is "inappropriate", and the screen-1 and the screen-3 display images whose display appropriateness is "appropriate". In this case, as shown in FIG. 7B, the image displaying application outputs the property indicating that the display appropriateness is "inappropriate" from the output starting time t1 to the output ending time t2 of the screen-2, and the property is transmitted to the on-vehicle device 20. When the output of the screen-2 ends and the output starting time t3 of the screen-3 arrives, the image displaying application stops the output of the property indicating that the display appropriateness is "inappropriate".

Figure 8A:
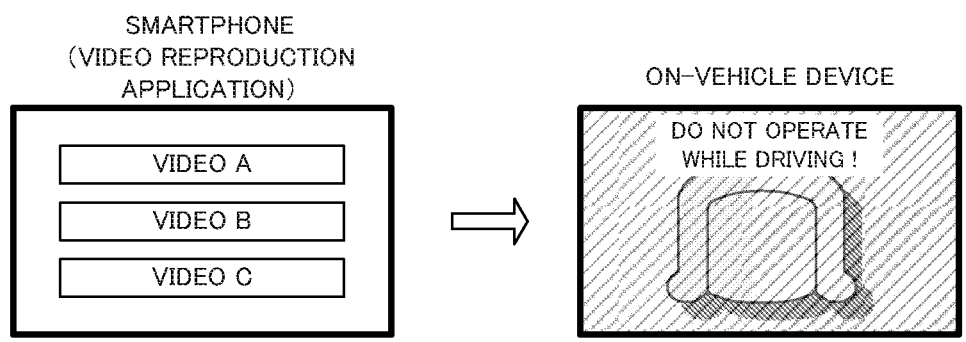
FIGS. 8A and 8B show display examples in the fifth embodiment.
Figure 8B:
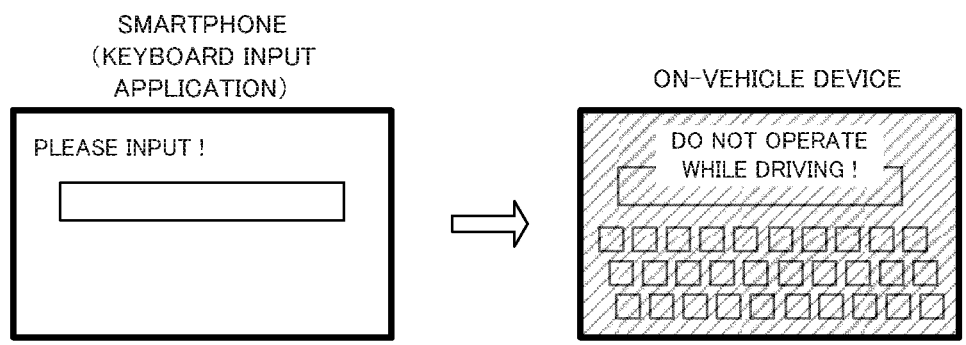

While the on-vehicle device 20 is receiving the information indicating that the display appropriateness is "inappropriate" as the property of the application, the on-vehicle device 20 executes the travelling regulation on the on-vehicle device 20 side. Specifically, as shown in the examples of FIGS. 8A and 8B, the on-vehicle device 20 stops the display of the image being outputted by the image displaying application, and displays a message inhibiting the operation during the travelling. It is noted that FIG. 8A is an example in which the image displaying application is a movie reproduction application and FIG. 8B is an example in which the image displaying application is a keyboard input application.

As described above, according to the fifth embodiment, the on-vehicle device 20 can execute the travelling regulation only when the image inappropriate to display during the travelling of the vehicle is being displayed, even if the output image of the same application is being displayed on the on-vehicle device 20. Therefore, the application can be effectively executed while ensuring necessary travelling regulation.

(Modified Example)

In the above example, the property indicating that the display appropriateness is "inappropriate" is transmitted to the on-vehicle device 20 only when the display appropriateness of the application image is "inappropriate". Instead, the property indicating that the display appropriateness is "appropriate" may also be transmitted to the on-vehicle device 20 and the on-vehicle device may execute the travelling regulation only when the display appropriateness is "inappropriate".

INDUSTRIAL APPLICABILITY

This invention can be used for an on-vehicle device such as a display device connected to a smartphone, typically a car navigation device.

DESCRIPTION OF REFERENCE NUMERALS

5 SPP
6 HDMI
10 Smartphone
11 Application
12 External control module
15 Resident application
20 On-vehicle device

The invention claimed is:

1. A display system comprising:
a display device loaded on a vehicle; and
an information processing terminal, an image being displayed by the display system based on an application executed by the information processing terminal on the display device,
wherein the information processing terminal comprises:
an image output unit which outputs an application image to the display device, and
a transmitting unit which transmits a property of the application to the display device, the property of the application being information indicating whether or not the application on which the application image output by the image output unit is based is externally controllable, and
wherein the display device comprises:
a display unit which displays the application image output by the image output unit, and
a control unit which determines whether or not the display device regulates the display of the application image in accordance with a running state of the vehicle, based on the property of the application.

2. The display system according to claim 1, wherein the control unit transmits information related to the running state of the vehicle to the information processing terminal when the property of the application indicates that the application is externally controllable.

3. The display system according to claim 1, wherein the property of the application includes information related to display appropriateness of the application image being outputted, and
wherein the control unit regulates the display of the application image when the vehicle is running, the property of the application indicates that the application is not externally controllable, and the information related to the display appropriateness indicates that the display during the running of the vehicle is inappropriate.

4. The display system according to claim 2, wherein the information processing terminal regulates the display of the application image when the application on which the application image is based is externally controllable and the information processing terminal receives information from the display device indicating that the vehicle is running.

* * * * *